2,768,973

PREPARATION OF GLYCOLALDEHYDE BY HYDROLYSIS OF 4-CHLORO-2-OXODIOXOLANE

John E. Castle, Hockessin, Del., and Vincent J. Webers, Red Bank, N. J., assignors to E. I. du Pont de Nemours and Company, Wilmington, Del., a corporation of Delaware No Drawing. Application November 30, 1954, Serial No. 472,204

7 Claims. (Cl. 260—602)

This invention relates to an improved process for the preparation of glycolaldehyde.

This application is a continuation-in-part of our copending application Ser. No. 373,045, filed August 7, 1953.

Glycolaldehyde, $HOCH_2CHO$, is a useful intermediate in the preparation of a variety of products, e. g., serine

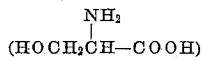

Glycolaldehyde, however, is not commercially available. Although a number of syntheses of glycolaldehyde are described in the literature, they are not particularly attractive from the commercial standpoint because of inconvenience and the presence of one or more defects. The required reactants for some syntheses are not readily available. In other processes the product is obtained in solution rather than crystalline form and in still other processes the yield is very low. There are also published methods wherein glycolaldehyde has been isolated, not as such, but as a derivative, for example, the phenylosazone. Glycolaldehyde exists in the monomeric form probably only in aqueous solution. The crystalline form is largely if not entirely the dimer (Karrer, 1938, page 229; Whitmore, 1937, page 398; Bell and Hirst, J. Chem. Soc. 1939, page 1777).

This invention has as an object the provision of a process whereby glycolaldehyde can be prepared from a readily available material. A further object is the provision of a convenient process for the preparation of crystalline glycolaldehyde. Other objects will appear hereinafter.

These objects are accomplished by the present invention of the process wherein 4-chloro-2-oxodioxolane (monochloroethylene carbonate) is hydrolyzed by contacting it with an aqueous medium having a pH of at least 3 whereby the chlorine is replaced by hydroxyl and the ring is simultaneously opened. The ethylene carbonate from which 4-chloro-2-oxodioxolane is prepared is readily available.

The reaction is conveniently carried out by mixing, with stirring, 4-chloro-2-oxodioxolane with an aqueous dispersion or suspension of a base. The dispersion need not necessarily be alkaline since excellent results are obtained when an aqueous suspension of litharge is employed. The pH of this suspension is about 5 during the hydrolysis. Good results can also be obtained when an aqueous solution containing one molar equivalent of sodium hydroxide is added, with stirring, to 4-chloro-2-oxodioxolane and cooling to a temperature around 0° C., the addition of the sodium hydroxide being suspended when the solution is about neutral and resumed when the reaction medium becomes acid. When sodium hydroxide is employed methanol and dioxane are added to precipitate the sodium chloride and sodium bicarbonate formed. The mixture is filtered and the glycolaldehyde in the filtrate is separated by distillation. The distilled product crystallizes out slowly on standing or it can be crystallized from acetone and benzene as the dimer.

The following equations illustrate the reaction:

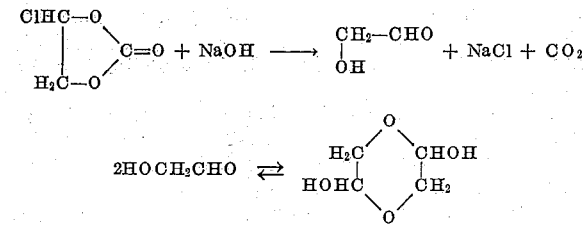

The dimer has been identified by Summerbell and Rochem in J. A. C. S., 63, 3241 (1941) as 2,5-dihydroxydioxane.

4-chloro-2-oxodioxolane is a new compound and its preparation by the chlorination of 2-oxodioxolane (cyclic ethylene carbonate) is described in the copending application of J. L. Anderson, Serial No. 348,580, filed April 13, 1953.

The following examples in which parts are by weight are illustrative of the invention.

Example I

A solution of 80.9 parts (2 moles) of 98.5% sodium hydroxide in 200 parts of water was slowly added with stirring and cooling to 122.5 parts of 4-chloro-2-oxodioxolane at 0–5° C. Phenolphthalein was added to the reaction mixture. The red color was almost instantly discharged after each addition of sodium hydroxide but a permanent red color was obtained when a small amount of sodium hydroxide solution remained to be added, so the addition was stopped at this point. This addition required a little over an hour. The red color was discharged by addition of a small quantity of concentrated hydrochloric acid. About 238 parts of methanol was added, the reaction mixture filtered, and the pH brought to 7.0. Methanol and part of the water were removed with a water pump, taking care that the temperature of the stillpot did not rise above 30° C. Dioxane was added to complete the precipitation of inorganic salts, the mixture was filtered, and the filtrate distilled. Glycolaldehyde distilled at 35° C. at 1.5 mm. to 63° C. at 2.6 mm. On standing 8.8 parts (14.6%) of glycolaldehyde crystallized slowly.

Example II

Example I was repeated except that only 125 parts of water was used and special care was taken to have the reaction mixture on the alkaline side for as short a time as possible. Twelve parts of glycolaldehyde was obtained.

Example III

A mixture of 100 parts of 4-chloro-2-oxodioxolane, 200 parts of litharge (lead monoxide), and 200 parts of water was stirred at room temperature for 72 hours (48 hours is sufficient). Ice bath cooling was necessary for the first few hours since the reaction was exothermic during this period. The lead salts were filtered and the pH of the filtrate was 3. Ten parts of litharge was added to the filtrate and the mixture was stirred for ½ hour. The pH of the filtrate was now 5. The water was removed by distillation under reduced pressure and the syrupy residue distilled at 40–80° C. at 1 mm. Thirty-five parts (72%) of monomeric glycolaldehyde was obtained which slowly crystallized to the dimeric form.

Example IV

A mixture of 100 parts of 4-chloro-2-oxodioxolane, 81.6 parts of potassium bicarbonate and 350 parts of water was stirred at room temperature. After two hours, the two phases became one and carbon dioxide evolution ceased. The pH of the solution was brought to 5–6 by the addition of dilute hydrochloric acid. As much of the water as possible was removed under reduced pressure. Some of the inorganic salts precipitated and the soluble salts were removed from solution by the addition of 500 parts of dioxane. The inorganic salts were filtered and the dioxane was removed from the filtrate by distillation under reduced pressure. The syrupy residue was distilled at 1 mm. and 18 g. (37%) of glycolaldehyde monomer was obtained which slowly crystallized to the dimeric form.

Calcium carbonate and sodium acetate were tried as hydrolyzing agents for 4-chloro-2-oxodioxolane under conditions similar to those described above. In each case hydrolysis occurred at room temperature resulting in a disappearance of the 4-chloro-2-oxodioxolane and the formation of a water solution of glycolaldehyde that gave a positive test for a reducing sugar with Fehling's solution.

*Example V*

A solution of 32.7 parts (0.82 mole) of sodium hydroxide in 200 parts of water was slowly added with stirring to 100 parts (0.82 mole) of 4-chloro-2-oxodioxolane at 0–5° C. Phenol red was added to the reaction mixture. The rate of addition of the alkaline solution was controlled such that the indicator was decolorized rapidly. When the addition was complete, the mixture was stirred at room temperature until all of the chloroethylene carbonate had reacted and carbon dioxide evolution had ceased. As much of the water as possible was distilled under reduced pressure. The inorganic salts were removed by adding dioxane and filtering. The remainder of the water and dioxane was removed under reduced pressure. The syrupy residue crystallized on standing. The crystals were triturated with acetone to obtain 20 parts (40% of glycolaldehyde dimer melting at 95–97° C.

The hydrolysis of 4-chloro-2-oxodioxolane according to the process of the present invention can be carried out by bringing the 4-chloro-2-oxodioxolane in contact with water containing, as a means for removal of the hydrogen chloride formed on hydrolysis, a base. Water insoluble bases can be employed, including silver oxide, the litharge of Example III above, calcium carbonate, etc. Water soluble bases, e. g., potassium bicarbonate, and the water soluble hydroxides of alkaline reaction in water including the hydroxides of the alkali forming metals including alkali metal hydroxides, e. g., lithium, sodium, and potassium hydroxides and alkaline earth metal hydroxides, e. g., barium and calcium hydroxides can be employed. Quaternary ammonium hydroxides, e. g., tetramethylammonium hydroxide and tetraethylammonium hydroxide can be used. Basic ion exchange resins can also be employed. The hydrolysis is preferably conducted at 0–30° C., but somewhat higher temperatures, e. g., 75° C. or even higher, can be used. Temperature below 0° C. attained by refrigeration or adding ice can also be employed. Thus temperatures, down to —15° C. can be employed but are not necessary. Omitting the alkaline material and using water alone or aqueous dioxane requires higher temperatures and leads to tarry products, presumably because glycolaldehyde is decomposed by the hydrogen chloride evolved by the hydrolysis. Acidities below a pH of about 3 are undesirable.

Glycolaldehyde is useful as an intermediate in the preparation of a number of chemical compounds, such as serine

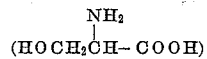

(HOCH$_2$CH—COOH)

(Fisher & Leuchs, Berichte 35, 3787 (1902)). It can be regarded as the simplest aldose, and on treatment with mild bases it can be polymerized to a mixture of hexoses. Glycolaldehyde can also be used as a mild reducing agent. The term "alkali forming metal" is used herein as defined in Classification Bulletin 78 at page 41 and in Classification Bullein 306 at page 3 and as indicated in Caven and Lander—Systematic Inorganic Chemistry (Blackie, Glasgow, 1936), page 114.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. In a process for the preparation of glycolaldehyde the step which comprises hydrolyzing 4-chloro-2-oxodioxolane with liquid water at a pH of at least about 3.

2. A process for the preparation of glycolaldehyde which comprises bringing 4-chloro-2-oxodioxolane in contact with liquid water containing a means for neutralizing hydrogen chloride.

3. A process for the preparation of glycolaldehyde which comprises bringing 4-chloro-2-oxodioxolane in contact with liquid water containing a base.

4. A process for the preparation of glycolaldehyde which comprises bringing 4-chloro-2-oxodioxolane in contact with liquid water containing a strong base.

5. A process for the preparation of glycolaldehyde which comprises bringing 4-chloro-2-oxodioxolane in contact with an aqueous solution of an alkali forming metal hydroxide.

6. A process for the preparation of glycolaldehyde which comprises bringing 4-chloro-2-oxodioxolane in contact with an aqueous solution of an alkali metal hydroxide.

7. A process for the preparation of glycolaldehyde which comprises bringing 4-chloro-2-oxodioxolane in contact with an aqueous solution of sodium hydroxide.

References Cited in the file of this patent

UNITED STATES PATENTS 2,511,942    Prichard              June 20, 1950

OTHER REFERENCES

Contardi et al.: Gazzette Chim. Italiana, vol. 64 (1934), pp. 522–526.

Carlson et al.: J. A. C. S., vol. 69 (1947), pp. 1952–56.